US011372651B2

(12) United States Patent
Wood et al.

(10) Patent No.: US 11,372,651 B2
(45) Date of Patent: Jun. 28, 2022

(54) BOOTSTRAPPING A VARIATIONAL ALGORITHM FOR QUANTUM COMPUTING

(71) Applicant: International Business Machines Corporation, Armonk, NY (US)

(72) Inventors: Stephen Wood, Thornwood, NY (US); Richard Chen, Mount Kisco, NY (US); Marco Pistoia, Amawalk, NY (US); Antonio Mezzacapo, Westchester, NY (US); Jay M. Gambetta, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 788 days.

(21) Appl. No.: 16/126,002

(22) Filed: Sep. 10, 2018

(65) Prior Publication Data
US 2020/0081721 A1    Mar. 12, 2020

(51) Int. Cl.
*G06F 9/4401* (2018.01)
*G06N 10/00* (2022.01)

(52) U.S. Cl.
CPC .......... *G06F 9/4401* (2013.01); *G06N 10/00* (2019.01)

(58) Field of Classification Search
CPC .................................................. G06F 9/4401
USPC ................ 706/45; 702/27; 712/28; 713/100; 326/5; 505/170
See application file for complete search history.

(56) References Cited

U.S. PATENT DOCUMENTS

| 9,588,940 B2 | 3/2017 | Hamze | |
|---|---|---|---|
| 9,940,212 B2 | 4/2018 | Kelly | |
| 2007/0239366 A1* | 10/2007 | Hilton | B82Y 10/00 702/27 |
| 2013/0278283 A1* | 10/2013 | Berkley | G06N 10/00 326/5 |

(Continued)

FOREIGN PATENT DOCUMENTS

WO    2017031356 A1    2/2017

OTHER PUBLICATIONS

Nathan Wiebe et al., Quantum bootstrapping via compressed quantum Hamiltonian learning, 2015 New J. Phys. 17022005.

*Primary Examiner* — Ruay Ho
(74) *Attorney, Agent, or Firm* — Garg Law Firm, PLLC; Rakesh Garg; Joseph Petrokaitis (57) ABSTRACT

A method for bootstrapping a variational algorithm for quantum computing includes performing, using a quantum processor, a first iteration of a variational algorithm on a first wavefunction to compute a first expectation value of a first quantum system corresponding to a solution of the first iteration, the first wavefunction corresponding to a first quantum state of the first quantum system, the first expectation value comprising an energy of the first quantum state. The embodiment includes generating, based on the solution of the first iteration a second wavefunction as output of the first iteration of the variational algorithm, the second wavefunction corresponding to a second quantum state of the first quantum system. The embodiment includes performing, using the quantum processor, a second iteration of the variational algorithm on the second wavefunction to compute a second expectation value of a second quantum system, the second expectation value comprising an energy of a first quantum state of the second quantum system.

16 Claims, 5 Drawing Sheets

(56) References Cited

U.S. PATENT DOCUMENTS

| | | | |
|---|---|---|---|
| 2014/0187427 A1* | 7/2014 | Macready | G06N 5/02 |
| | | | 505/170 |
| 2014/0337612 A1* | 11/2014 | Williams | G06F 13/4068 |
| | | | 713/100 |
| 2016/0071021 A1* | 3/2016 | Raymond | G06N 10/00 |
| | | | 712/28 |
| 2017/0255872 A1* | 9/2017 | Hamze | G06N 3/12 |
| 2017/0351967 A1 | 12/2017 | Babbush | |
| 2018/0096085 A1* | 4/2018 | Rubin | G16C 10/00 |
| 2018/0232652 A1 | 8/2018 | Curtis | |
| 2021/0081804 A1* | 3/2021 | Stojevic | G06N 3/0454 |

* cited by examiner

BOOTSTRAPPING A VARIATIONAL ALGORITHM FOR QUANTUM COMPUTING

TECHNICAL FIELD

The present invention relates generally to quantum computing. More particularly, the present invention relates to a method for bootstrapping a variational algorithm for quantum computing.

BACKGROUND

Hereinafter, a "Q" prefix in a word of phrase is indicative of a reference of that word or phrase in a quantum computing context unless expressly distinguished where used.

Molecules and subatomic particles follow the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

The computers we use today are known as classical computers (also referred to herein as "conventional" computers or conventional nodes, or "CN"). A conventional computer uses a conventional processor fabricated using semiconductor materials and technology, a semiconductor memory, and a magnetic or solid-state storage device, in what is known as a Von Neumann architecture. Particularly, the processors in conventional computers are binary processors, i.e., operating on binary data represented in 1 and 0.

A quantum processor (q-processor) uses the odd nature of entangled qubit devices (compactly referred to herein as "qubit," plural "qubits") to perform computational tasks. In the particular realms where quantum mechanics operates, particles of matter can exist in multiple states—such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Conventional computers encode information in bits. Each bit can take the value of 1 or 0. These 1s and 0s act as on/off switches that ultimately drive computer functions. Quantum computers, on the other hand, are based on qubits, which operate according to two key principles of quantum physics: superposition and entanglement. Superposition means that each qubit can represent both a 1 and a 0 at the same time. Entanglement means that qubits in a superposition can be correlated with each other in a non-classical way; that is, the state of one (whether it is a 1 or a 0 or both) can depend on the state of another, and that there is more information that can be ascertained about the two qubits when they are entangled than when they are treated individually.

Using these two principles, qubits operate as more sophisticated processors of information, enabling quantum computers to function in ways that allow them to solve difficult problems that are intractable using conventional computers. IBM has successfully constructed and demonstrated the operability of a quantum processor using superconducting qubits (IBM is a registered trademark of International Business Machines corporation in the United States and in other countries.)

The illustrative embodiments recognize that quantum processors can perform variational algorithms which conventional processors are incapable of performing. Variational algorithms may use a trial wavefunction which is varied to determine an upper bound to a ground state energy of a quantum system. A wavefunction is a mathematical description of a quantum state of a quantum system. A quantum state is represented on a quantum processor as a series of quantum logic gates acting on qubits. Each quantum state of a quantum system includes a corresponding energy value. A wavefunction that corresponds to a ground state of the quantum system is an eigenfunction. The total energy of the ground state of the quantum system corresponds to a minimum possible value of the total energy of the quantum system. A Hamiltonian is an operator that describes the total energy of a quantum state. A Hamiltonian operator acting on the eigenfunction observes an eigenvalue corresponding to the total energy of the quantum state.

In order to compute an upper bound to the ground state energy of a quantum system, variational algorithms perform numerous evaluations beginning with an initial wavefunction. Each evaluation computes a total energy of a quantum state corresponding to the wavefunction being evaluated. Variational algorithms can then alter parameters of the evaluated wavefunction to generate a new wavefunction, such as, altering at least one quantum logic gate of a set of quantum logic gates to perform a rotation on a qubit. Evaluation of the new wavefunction computes a total energy of the new quantum state corresponding to the new wavefunction. The variational algorithm compares the total energy of the previous wavefunction to the total energy of the new wavefunction. A conventional processor performs an optimization algorithm that varies the parameters of the wavefunction. A quantum processor computes the corresponding total energy of the wavefunction. Based on the comparison between the total energy of the new wavefunction and the previous wavefunction, the optimization algorithm determines how to vary the parameters of the wavefunction in order to minimize the computed total energy of the quantum system.

A variational algorithm can continue performing evaluations until the computed total energy is relatively stable. The stable computed total energy from the final evaluation corresponds to an upper bound of the minimum energy of the ground state of the quantum system. The corresponding wavefunction represents an approximation of the eigenfunction of the quantum system.

The illustrative embodiments recognize that eigenfunctions of many quantum systems are not known or are too complex. The illustrative embodiments recognize that the trial wavefunction may be randomly chosen and may vary greatly from the eigenfunction of the quantum system. The illustrative embodiments recognize that the further away the initial wavefunction is from the eigenfunction of the quantum system, that a greater number of evaluations is likely to be necessary to reach an approximation of the eigenfunction. The illustrative embodiments recognize that similar quantum systems can have similar eigenfunctions. The illustrative embodiments also recognize that bootstrapping a variational algorithm, that is, using a solution from a first iteration of the variational algorithm as input for a second iteration of the variational algorithm, on a closely related problem, can reduce the number of evaluations necessary to reach a solution for the second iteration.

SUMMARY

The illustrative embodiments provide a method, system, and computer program product for bootstrapping a variational algorithm for quantum computing. An embodiment includes a method for bootstrapping a variational algorithm for quantum computing including performing, using a quantum processor, a first iteration of a variational algorithm on a first wavefunction to compute a first expectation value of a first quantum system corresponding to a solution of the first iteration, the first wavefunction corresponding to a first quantum state of the first quantum system, the first expectation value comprising an energy of the first quantum state. The embodiment includes generating, based on the solution of the first iteration, a second wavefunction as output of the first iteration of the variational algorithm, the second wavefunction corresponding to a second quantum state of the first quantum system. The embodiment includes performing, using the quantum processor, a second iteration of the variational algorithm on the second wavefunction to compute a second expectation value of a second quantum system corresponding to a solution of the second iteration, the second expectation value comprising an energy of a first quantum state of the second quantum system.

An embodiment performing, using the quantum processor, the first iteration of the variational algorithm includes varying at least one parameter of a set of parameters in a first configuration, the first configuration corresponding to the first quantum state of the first quantum system.

An embodiment varying the at least one parameter includes generating a second configuration of the set of parameters.

An embodiment performing, using the quantum processor, the second iteration of the variational algorithm includes varying at least one parameter of a second set of parameters in a first configuration, the first configuration corresponding to the first quantum state of the second quantum system.

An embodiment generates, based on the solution of the second iteration, a third wavefunction as output of the second iteration of the variational algorithm, the third wavefunction corresponding to a second quantum state of the second quantum system.

An embodiment performs, using the quantum processor, a third iteration of the variational algorithm on the third wavefunction to compute a third expectation value of a third quantum system, the third expectation value comprising an energy of a first quantum state of the third quantum system.

An embodiment performing, using the quantum processor, the third iteration of the variational algorithm includes varying at least one parameter of a third set of parameters in a first configuration, the first configuration corresponding to the first quantum state of the third quantum system.

In an embodiment, the first quantum state of the first quantum system corresponds to a set of quantum logic gates on the quantum processor.

In an embodiment, the method is embodied in a computer program product comprising one or more computer-readable storage devices and computer-readable program instructions which are stored on the one or more computer-readable tangible storage devices and executed by one or more quantum processors.

An embodiment includes a computer usable program product. The computer usable program product includes a computer-readable storage device, and program instructions stored on the storage device.

An embodiment includes a computer system. The computer system includes a quantum processor, a computer-readable memory, and a computer-readable storage device, and program instructions stored on the storage device for execution by the quantum processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments used to describe the invention generally address and solve the above-described problem of variational algorithms for quantum computing. The illustrative embodiments provide a method for bootstrapping a variational algorithm for quantum computing.

An embodiment provides a method for bootstrapping a variational algorithm for quantum computing. Another embodiment provides a quantum computer usable program product comprising a quantum computer-readable storage device, and quantum program instructions stored on the storage device, the stored program instructions comprising a method for bootstrapping a variational algorithm for quantum computing. The instructions are executable using a quantum processor. Another embodiment provides a quantum computer system comprising a quantum processor, a computer-readable memory, and a computer-readable storage device, and program instructions stored on the storage device for execution by the quantum processor via the memory, the stored program instructions comprising a method for bootstrapping a variational algorithm for quantum computing.

The illustrative embodiments recognize that quantum processors can perform variational algorithms to compute an approximation of the ground state energy of a quantum system, for instance, an electron orbital configuration for a molecule with a given interatomic spacing. The Variational Quantum Eigensolver (VQE) is one example of a variational algorithm performed with quantum processors. VQE varies parameters to prepare a quantum state and determines the properties of prepared quantum states. A quantum state is prepared on a quantum processor as a series of quantum logic gates acting on qubits.

The illustrative embodiments recognize that the initial quantum state (wavefunction) may be randomly chosen because the eigenfunction of the quantum system is either unknown or too complex. The variational algorithm performs evaluations of the quantum states to determine properties of the initial quantum state, vary parameters to prepare a new quantum state, determine properties of the new quantum state, and compare the properties of the initial quantum state and the new quantum state.

Variational algorithms iterate to generate new quantum states and to minimize a property corresponding to the quantum states. Variational algorithms include an optimizer to minimize a property corresponding to the quantum states.

Each evaluation performed by the variational algorithm includes varying parameters to generate a new quantum state, computing properties of the new quantum state, comparing properties of the new quantum state and a previous quantum state, and determining, based on the comparison, how to vary the parameters in a successive evaluation. For instance, the variational algorithm can perform evaluations to determine an upper bound of the ground state energy of the quantum system.

The variational algorithm varies parameters to generate new quantum states and compares the total energy of the new quantum states to a total energy of previous quantum states. The optimizer of the variational algorithm determines which parameters and/or how to vary the parameters to reduce the computed total energy of the generated quantum states. The variational algorithm continues performing evaluations until the computed total energy reaches a minimum, becoming relatively stable. The computed total energy for the final evaluation corresponds to an upper bound of the ground state energy of the quantum system.

The illustrative embodiments recognize that the initial quantum state may vary greatly from the prepared quantum state corresponding to the minimized property. The illustrative embodiments recognize that reducing the number of evaluations performed by the variational algorithm necessary to reach a final prepared quantum state corresponding to the minimized property reduces the total time and resources the variational algorithm takes to compute the final prepared quantum state. The illustrative embodiments recognize that selecting an initial quantum state closer to the final prepared quantum state reduces the number of evaluations necessary to compute the final prepared quantum state.

For the clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for bootstrapping a variational algorithm for quantum computing using a variety of components that can be purposed or repurposed to provide a described function within a data processing environment, and such adaptations are contemplated within the scope of the illustrative embodiments.

The illustrative embodiments are described with respect to certain types of steps, applications, quantum logic gates, and data processing environments only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
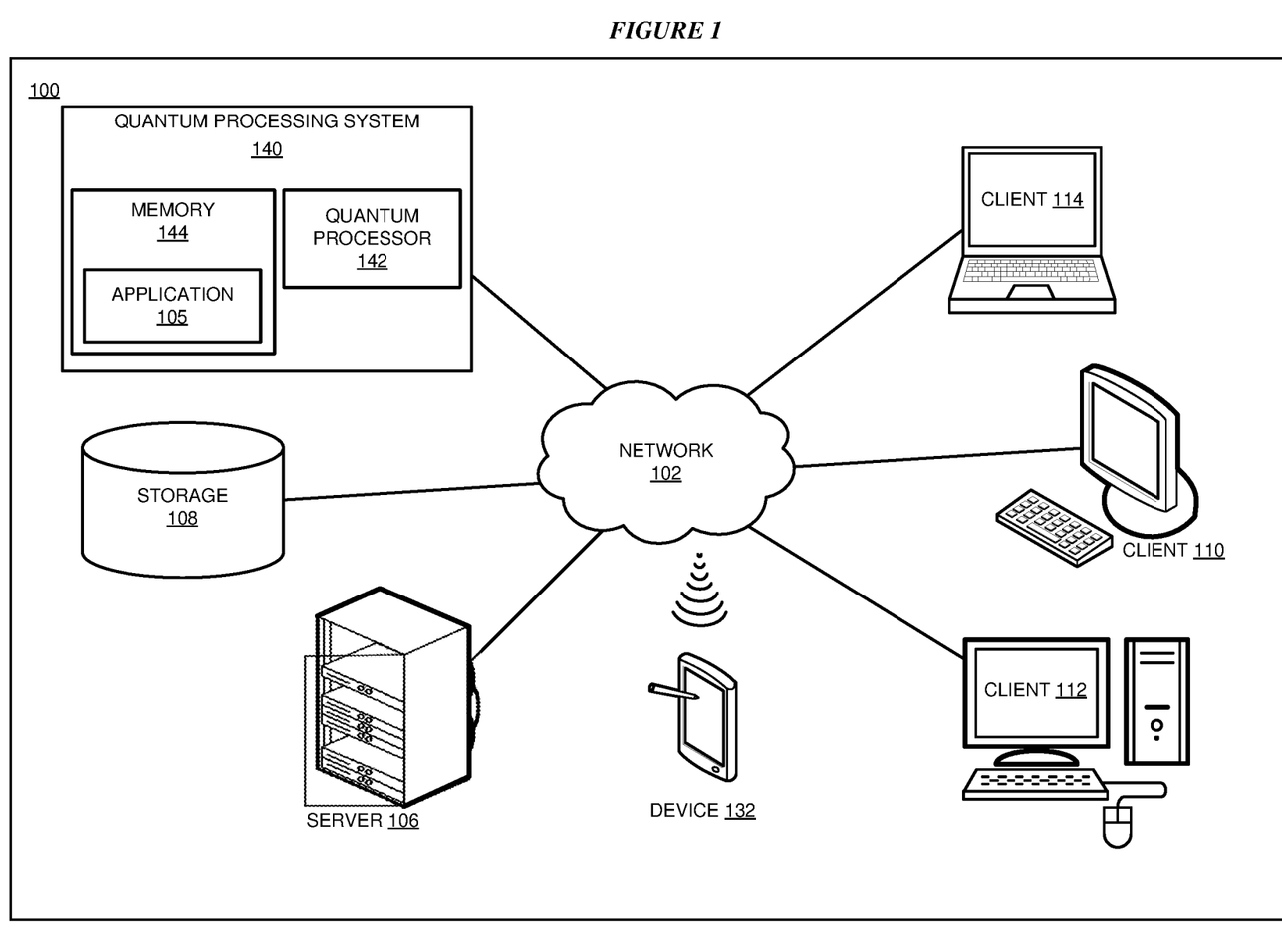
FIG. 1 depicts a block diagram of a network of data processing systems in which illustrative embodiments may be implemented.
Figure 2:
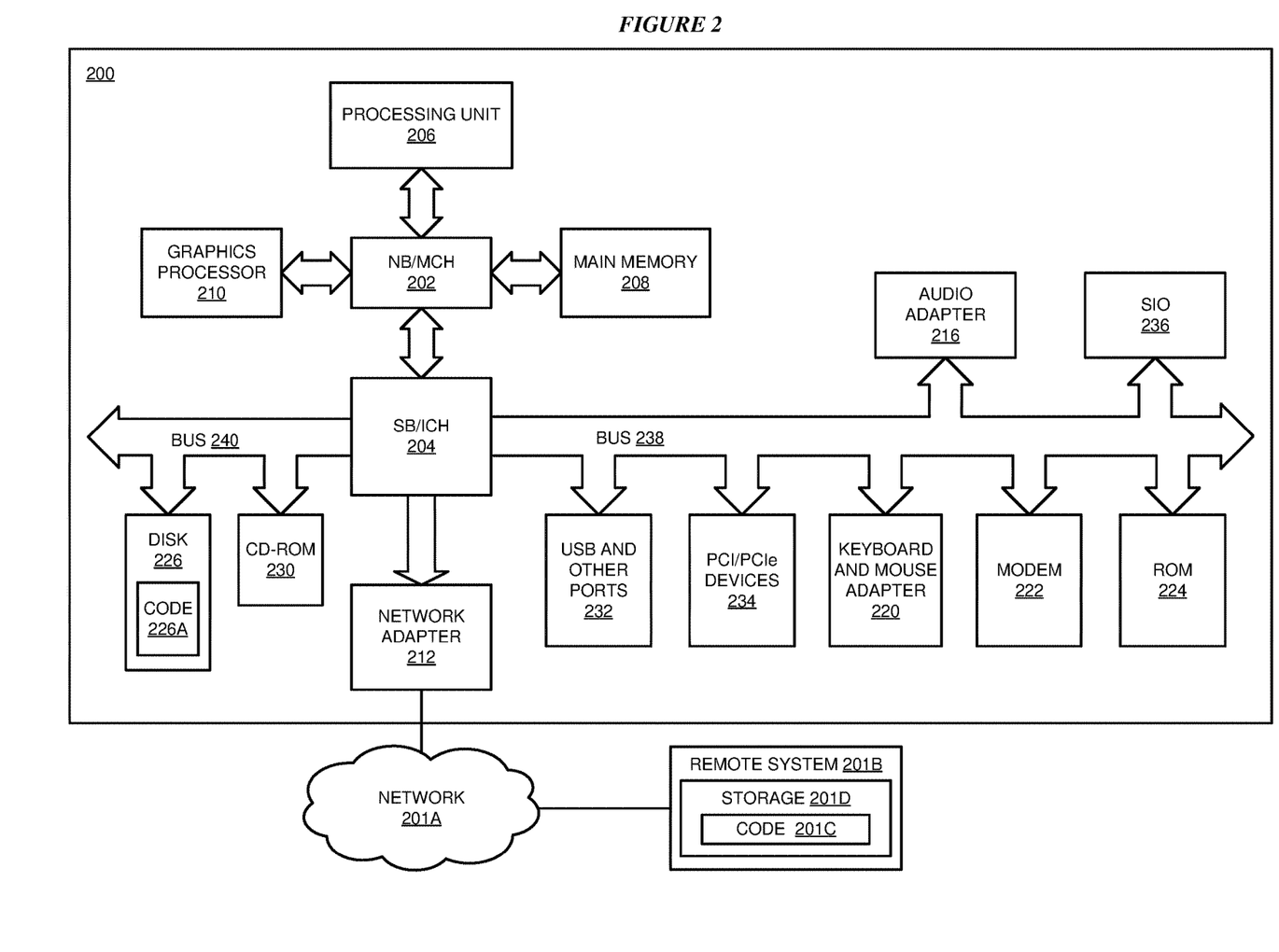
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 106 couples to network 102 along with storage unit 108. Server 106 is a conventional data processing system. Quantum processing system 140 couples to network 102. Quantum processing system 140 is a quantum data processing system. Software applications may execute on any quantum data processing system in data processing environment 100. Any software application described as executing in quantum processing system 140 in FIG. 1 can be configured to execute in another quantum data processing system in a similar manner. Any data or information stored or produced in quantum processing system 140 in FIG. 1 can be configured to be stored or produced in another quantum data processing system in a similar manner. A quantum data processing system, such as quantum processing system 140, may contain data and may have software applications or software tools executing quantum computing processes thereon.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several conventional data processing systems, quantum data processing systems, and a data network as shown, whereas another embodiment can be implemented on a single conventional data processing system or single quantum data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, quantum processing system 140, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 144 may provide data, such as boot files, operating system images, and applications to quantum processor 142. Quantum processor 142 may include its own data, boot files, operating system images, and applications. Data processing environment 100 may include additional memories, quantum processors, and other devices that are not shown. Memory 144 includes application 105 that may be configured to implement one or more of the functions described herein for bootstrapping a variational algorithm for quantum computing in accordance with one or more embodiments.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as servers 104 and 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
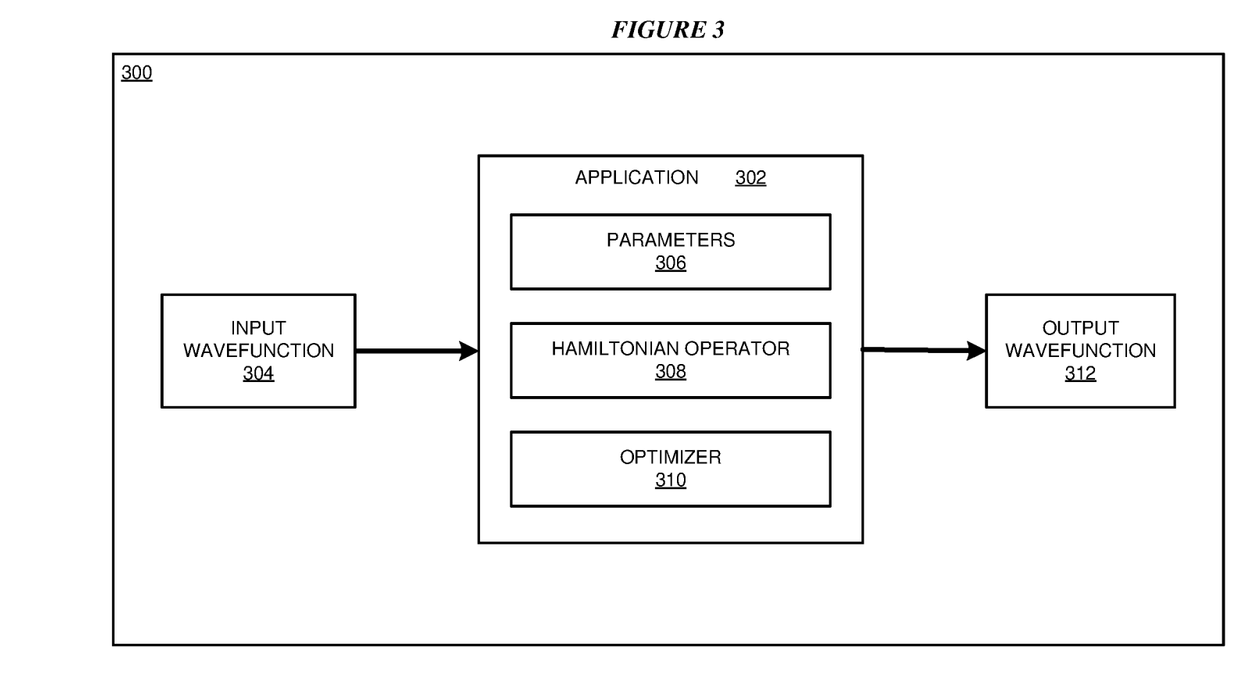
FIG. 3 depicts a block diagram of an example configuration for bootstrapping a variational algorithm for quantum computing.

With reference to FIG. 3, this figure depicts a block diagram of an example configuration 300 for bootstrapping a variational algorithm for quantum computing. The example embodiment includes an application 302. In a particular embodiment, application 302 is an example of application 105 of FIG. 1.

Application 302 receives an input wavefunction 304 which represents a mathematical description of an initial quantum state of a quantum system. The initial quantum state is represented on a quantum processor by a set of quantum logic gates acting on a set of qubits. The input wavefunction is parameterized and includes an initial set of parameters in a first configuration, the first configuration corresponding to the initial quantum state.

Application 302 includes a parameter component 306, a Hamiltonian operator component 308, and an optimizer component 310. In the embodiment, parameter component 306 controls and manages a set of parameters that determine the quantum state. In an embodiment, Hamiltonian operator component 308 controls and manages the Hamiltonian operator of the quantum system. The Hamiltonian operator, when acting on the wavefunction, corresponds to a total energy of the quantum system. When acting on the wavefunction, the Hamiltonian operator determines an expectation value or average of the total energy of the quantum state. The expectation value ($\langle H \rangle_\psi$) of the Hamiltonian operator is calculated by the formula $\langle H \rangle_\psi = \langle \psi | H | \psi \rangle = \int_{-\infty}^{\infty} \psi^* H \psi dV$, where $\psi$ is the wavefunction and the integral is over all space.

In an embodiment, optimizer component 310 computes a first expectation value of the Hamiltonian operator corresponding to the initial quantum state, varies at least one parameter of a set of parameters of the initial quantum state, generates, based on the variation, a new quantum state, computes a second expectation value of the Hamiltonian operator corresponding to the new quantum state, and compares the first expectation value and the second expectation value.

In an embodiment, optimizer component 310 varies at least one parameter of a set of parameters in order to minimize a computed expectation value of the Hamiltonian operator. For example, optimizer component 310 may determine the second expectation value is less than the first expectation value. In the embodiment, optimizer component 310 varies at least one parameter of the set of parameters in a similar manner as a previous variation. In an embodiment, optimizer component 310 continues generating new quantum states, computing new expectation values, and comparing new expectation values to previous expectation values until the expectation value stabilizes. For example, optimizer component 310 continues until new expectation value differs from previous expectation value by less than a threshold percentage, such as 0.001%. The final computed expectation value corresponds to an optimized quantum state. Application 302 generates an output wavefunction 312 in which the output wavefunction includes a mathematical description of the optimized quantum state.

Figure 4:
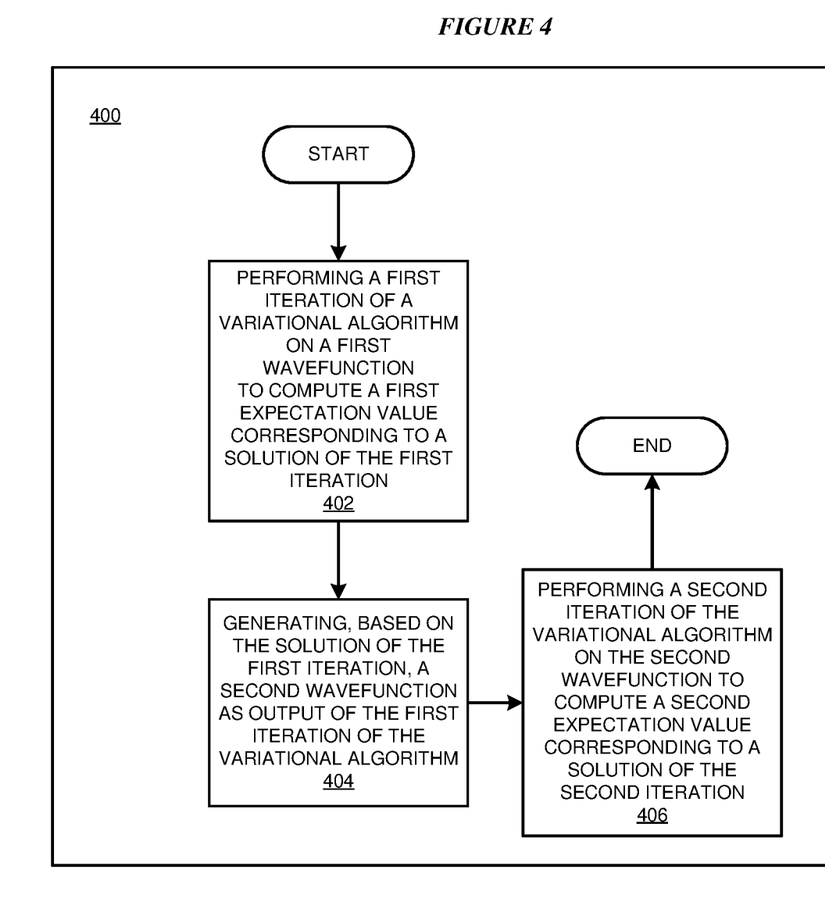
FIG. 4 depicts a flowchart of an example method for bootstrapping a variational algorithm for quantum computing in accordance with an illustrative embodiment.

With reference to FIG. 4, this figure depicts a flowchart of an example method 400 for bootstrapping a variational algorithm for quantum computing in accordance with an illustrative embodiment. In block 402, application 302 performs a first iteration of a variational algorithm on a first input wavefunction to compute a first expectation value corresponding to a solution of the first iteration. For example, the variational algorithm may compute a minimized expectation value of the Hamiltonian operator of a molecule with a first given interatomic spacing as a solution of the first iteration. In an embodiment, the first expectation value corresponds to a minimized expectation value of the Hamiltonian operator as a solution of the first iteration.

In block 404, application 302 generates a second wavefunction based on the solution of the first iteration. Application 302 generates the second wavefunction as output of the first iteration of the variational algorithm. The second wavefunction can be a solution wavefunction corresponding to the first expectation value of the first iteration. For example, when the Hamiltonian operator acts on the solution wavefunction, the first expectation value corresponding to the solution of the first iteration is returned. In an embodiment, the second wavefunction includes a mathematical description of an optimized quantum state. In block 406, application 302 performs a second iteration of the variational algorithm on the second wavefunction. For example, the variational algorithm may compute a minimized expectation value of the Hamiltonian operator of the molecule with a second given interatomic spacing as a solution of the second iteration. Method 400 then ends.

In some embodiments, method 400 continues after block 404. Method 400 can continue to perform subsequent iterations of the variational algorithm using the solution of the previous iteration to generate an input wavefunction for the subsequent iteration. For example, an output wavefunction corresponding to a solution wavefunction from previous iterations can be used as the input wavefunction for subsequent iterations.

Figure 5:
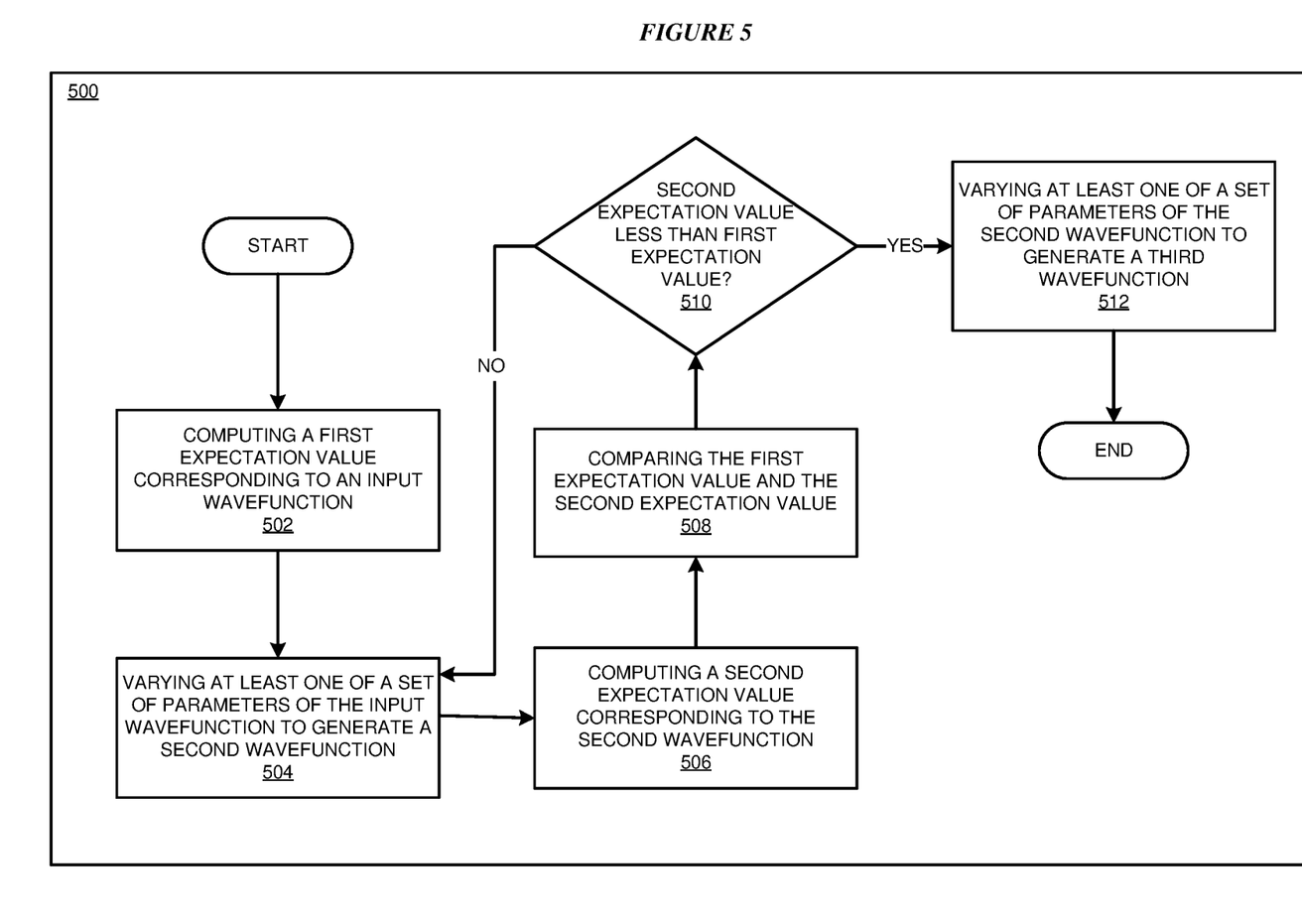
FIG. 5 depicts a flowchart of an example method 500 for a variational algorithm for quantum computing.

With reference to FIG. 5, this figure depicts a flowchart of an example method 500 for a variational algorithm for quantum computing. Example method 500 may be performed by application 302 at steps 402 and/or 406 of method 400. Application 302 receives an input wavefunction representing a mathematical description of an initial quantum state of a quantum system. The initial quantum state is represented on a quantum processor executing application 302 as a set of quantum logic gates acting on a set of qubits. The input wavefunction includes a set of parameters in a first configuration, the first configuration corresponding to the initial quantum state. In block 502, application 302 calculates a first expectation value of a Hamiltonian operator, the first expectation value corresponding to the input wavefunction.

In block 504, application 302 varies at least one parameter of the set of parameters to generate a second configuration, the second configuration corresponding to a second quantum state of the quantum system having a second wavefunction. For example, the application 302 may vary qubit rotation angles of the quantum processor executing application 302. In block 506, application 302 calculates a second expectation value of the Hamiltonian operator, the second expectation value corresponding to the second wavefunction. In block 508, application 302 compares the first expectation value and the second expectation value.

If the second expectation value is less than the first expectation value ("Yes" path of block 510), the application 302 moves to block 512. In block 512, application 302 varies at least one parameter of the set of parameters to generate a third configuration, the third configuration corresponding to a third quantum state of the quantum system having a third wavefunction. For example, application 302 may vary a different parameter of the set of parameters from previous block 504. In an embodiment, application 302 returns to block 506 to calculate a third expectation value of the Hamiltonian operator corresponding to the third wavefunction. In the embodiment, application 302 continues method 500 until block 508 compares a newly calculated expectation value to a previous expectation value and determines newly calculated expectation value differs from previous expectation value by less than a threshold percentage, such as 0.001%. Method 500 then ends.

If the second expectation value is greater than the first expectation value ("No" path of block 510), the application 302 returns to block 504. In block 504, application 302 varies at least one parameter of the set of parameters to generate a third configuration, the third configuration corresponding to a third quantum state of the quantum system having a third wavefunction. For example, application 302 may vary a different parameter of the set of parameters from previous block 504. In an embodiment, application 302 continues to block 506 to calculate a third expectation value of the Hamiltonian operator corresponding to the third wavefunction. In the embodiment, application 302 continues method 500 until block 508 compares a newly calculated expectation value to a previous expectation value and determines newly calculated expectation value differs from previous expectation value by less than a threshold percentage, such as 0.001%. Method 500 then ends.

Various embodiments of the present invention are described herein with reference to the related drawings. Alternative embodiments can be devised without departing from the scope of this invention. For example, additional variational algorithms for quantum computing may be included in any of methods 400, 500 without departing from the scope of the present invention.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
   performing, using a quantum processor, a variational algorithm on a first quantum system, the variational algorithm comprising:
      evaluating the first quantum system using a first plurality of wavefunctions corresponding to respective quantum states of the first quantum system,
      wherein the first plurality of wavefunctions are generated during respective iterations of the variational algorithm including a first iteration that comprises modifying a first parameter by modifying a qubit rotation angle to generate one of the first plurality of wavefunctions and a second iteration that comprises modifying a second parameter different from the first parameter to generate another of the first plurality of wavefunctions, and
      identifying a first solution wavefunction among the first plurality of wavefunctions that approximates an eigenfunction of the first quantum system;
   designating, based on a comparison of the first quantum system to a second quantum system, the first solution wavefunction as a starting wavefunction for evaluating the second quantum system; and
   performing, using the quantum processor, the variational algorithm on the second quantum system, the variational algorithm comprising:
      evaluating the second quantum system using a second plurality of wavefunctions corresponding to respective quantum states of the second quantum system,
      wherein the second plurality of wavefunctions includes the first solution wavefunction as the starting wavefunction, and
      identifying a second solution wavefunction from among the second plurality of wavefunctions that approximates an eigenfunction of the second quantum system.

2. The method of claim 1, wherein the performing of the variational algorithm on the second quantum system further comprises:
   varying at least one parameter of the starting wavefunction to derive a second wavefunction of the second plurality of wavefunctions.

3. The method of claim 1, further comprising:
   designating, based on a comparison of the second quantum system to a third quantum system, the second solution wavefunction as a starting wavefunction for evaluating the third quantum system.

4. The method of claim 3, further comprising:
   performing, using the quantum processor, the variational algorithm on the third quantum system, the variational algorithm comprising:
      evaluating the third quantum system using a third plurality of wavefunctions, and identifying a third solution wavefunction from among the third plurality of wavefunctions that approximates an eigenfunction of the third quantum system.

5. The method of claim 4, wherein the performing of the variational algorithm on the third quantum system further comprises:
   varying at least one parameter of a first wavefunction of the third plurality of wavefunctions to derive a second wavefunction of the third plurality of wavefunctions.

6. The method of claim 1, wherein the first quantum state of the first quantum system corresponds to a set of quantum logic gates on the quantum processor.

7. A computer usable program product comprising a computer-readable storage device, and program instructions stored on the storage device, the stored program instructions comprising:
   program instructions to perform, using a quantum processor, a variational algorithm on a first quantum system, the variational algorithm comprising:
      evaluating the first quantum system using a first plurality of wavefunctions corresponding to respective quantum states of the first quantum system,
      wherein the first plurality of wavefunctions are generated during respective iterations of the variational algorithm including a first iteration that comprises modifying a first parameter by modifying a qubit rotation angle to generate one of the first plurality of wavefunctions and a second iteration that comprises modifying a second parameter different from the first parameter to generate another of the first plurality of wavefunctions, and
      identifying a first solution wavefunction among the first plurality of wavefunctions that approximates an eigenfunction of the first quantum system;
   program instructions to designate, based on a comparison of the first quantum system to a second quantum system, the first solution wavefunction as a starting wavefunction for evaluating the second quantum system; and
   program instructions to perform, using the quantum processor, the variational algorithm on the second quantum system, the variational algorithm comprising:
      evaluating the second quantum system using a second plurality of wavefunctions corresponding to respective quantum states of the second quantum system,
      wherein the second plurality of wavefunctions includes the first solution wavefunction as the starting wavefunction, and
      identifying a second solution wavefunction from among the second plurality of wavefunctions that approximates an eigenfunction of the second quantum system.

8. The computer usable program product of claim 7, wherein the computer usable code is stored in a computer readable storage device in a data processing system, and wherein the computer usable code is transferred over a network from a remote data processing system.

9. The computer usable program product of claim 7, wherein the computer usable code is stored in a computer readable storage device in a server data processing system, and wherein the computer usable code is downloaded over a network to a remote data processing system for use in a computer readable storage device associated with the remote data processing system.

10. The computer usable program product of claim 9, wherein the program instructions to perform, using the quantum processor, the variational algorithm on the second quantum system further comprise:
    program instructions to vary at least one parameter of the starting wavefunction to derive a second wavefunction of the second plurality of wavefunctions.

11. The computer usable program product of claim 7, the stored program instructions further comprising:
    program instructions to designate, based on a comparison of the second quantum system to a third quantum system, the second solution wavefunction as a starting wavefunction for evaluating the third quantum system.

12. The computer usable program product of claim 11, the stored program instructions further comprising:
    program instructions to perform, using the quantum processor, the variational algorithm on the third quantum system, the variational algorithm comprising:
    evaluating the third quantum system using a third plurality of wavefunctions, and identifying a third solution wavefunction from among the third plurality of wavefunctions that approximates an eigenfunction of the third quantum system.

13. The computer usable program product of claim 12, wherein the program instructions to perform, using the quantum processor, the variational algorithm on the third quantum system further comprise:
    program instructions to vary at least one parameter of a first wavefunction of the third plurality of wavefunctions to derive a second wavefunction of the third plurality of wavefunctions.

14. The computer usable program product of claim 7, wherein the first quantum state of the first quantum system corresponds to a set of quantum logic gates on the quantum processor.

15. A computer system comprising a quantum processor, a computer-readable memory, and a computer-readable storage device, and program instructions stored on the storage device for execution by the quantum processor via the memory, the stored program instructions comprising:
    program instructions to perform, using a quantum processor, a variational algorithm on a first quantum system, the variational algorithm comprising:
        evaluating the first quantum system using a first plurality of wavefunctions corresponding to respective quantum states of the first quantum system,
        wherein the first plurality of wavefunctions are generated during respective iterations of the variational algorithm including a first iteration that comprises modifying a first parameter by modifying a qubit rotation angle to generate one of the first plurality of wavefunctions and a second iteration that comprises modifying a second parameter different from the first parameter to generate another of the first plurality of wavefunctions, and
        identifying a first solution wavefunction among the first plurality of wavefunctions that approximates an eigenfunction of the first quantum system;
    program instructions to designate, based on a comparison of the first quantum system to a second quantum system, the first solution wavefunction as a starting wavefunction for evaluating the second quantum system; and
    program instructions to perform, using the quantum processor, the variational algorithm on the second quantum system, the variational algorithm comprising:
        evaluating the second quantum system using a second plurality of wavefunctions corresponding to respective quantum states of the second quantum system,
        wherein the second plurality of wavefunctions includes the first solution wavefunction as the starting wavefunction, and
        identifying a second solution wavefunction from among the second plurality of wavefunctions that approximates an eigenfunction of the second quantum system.

16. The computer system of claim 15, wherein the program instructions to perform, using the quantum processor, the variational algorithm on the first quantum system further comprise:
    varying at least one parameter of a first wavefunction of the first plurality of wavefunctions to derive a second wavefunction of the first plurality of wavefunctions.

* * * * *